United States Patent [19]
Uchinami

[11] Patent Number: 5,467,008
[45] Date of Patent: Nov. 14, 1995

[54] ELECTRONIC CONTROL DEVICE FOR CONTROLLING THE ALTERNATOR AND THE IDLING RPM OF AUTOMOTIVE ENGINE

[75] Inventor: Masanobu Uchinami, Himeji, Japan

[73] Assignee: Mitsubishi Denki Kabushiki Kaisha, Tokyo, Japan

[21] Appl. No.: 95,983

[22] Filed: Jul. 23, 1993

[30] Foreign Application Priority Data

Jul. 29, 1992 [JP] Japan ................................ 4-202075

[51] Int. Cl.$^6$ ........................................ H02J 7/14
[52] U.S. Cl. ............................ 322/27; 322/25; 322/28; 320/12
[58] Field of Search ............................ 320/7, 31; 322/7, 322/8, 14, 28, 25, 27; 324/428

[56] References Cited

U.S. PATENT DOCUMENTS

| | | | |
|---|---|---|---|
| 5,057,764 | 10/1991 | Fujimoto et al. | 322/14 |
| 5,256,959 | 10/1993 | Nagano et al. | 322/25 |
| 5,280,231 | 1/1994 | Kato et al. | 320/31 |
| 5,352,971 | 10/1994 | Nishimura | 322/27 |

FOREIGN PATENT DOCUMENTS

| | | | |
|---|---|---|---|
| 4108751 | 9/1991 | Germany | H02J 7/14 |
| 152400 | 4/1987 | Japan . | |

Primary Examiner—Steven L. Stephan
Assistant Examiner—Nicholas Ponomarenko
Attorney, Agent, or Firm—Sughrue, Mion, Zinn, Macpeak & Seas

[57] ABSTRACT

An automotive electronic control device includes an electronic control unit 6 for controlling an automotive alternator 2 and the ISCV (Idling Speed Control Valve) 8 of the engine. To improve the mileage of the automobile, the duty factor of the alternator 2 is reduced to zero when the electric load is a light load. Further, when the increase in the load current $I_L$ during the idling is above a load current threshold increment level $\Delta_{LT}$, the ISCV (Idling Speed Control Valve) 8 is controlled to increase the air intake, and, simultaneously, the duty factor of the alternator 2 is reduced to a low level for a predetermined length of time equal to the response time in which the rpm of the engine responds to the increase of the air intake effected by means of the ISCV (Idling Speed Control Valve) 8. The duty factor of the alternator 2 is gradually increased thereafter. The idling rpm of the engine can thus be stably controlled when a heavy electric load is turned on.

7 Claims, 8 Drawing Sheets

ELECTRONIC CONTROL DEVICE FOR CONTROLLING THE ALTERNATOR AND THE IDLING RPM OF AUTOMOTIVE ENGINE

BACKGROUND OF THE INVENTION

This invention relates to electronic control devices for controlling the output current of the alternator (AC generator of the automobile) in response to the state of the electric load, thereby realizing a stable control of the idling rpm of the engine.

The conventional automotive electronic control device, disclosed, for example, in Japanese Laid-Open Patent (Kokai) No. 1-247238, predicts the output current level of the alternator from the field duty signal (the control signal of the alternator, i.e., the on/off signal for the current supply to the field coil of the alternator), and performs the duty control in such a manner that when the duty factor of the signal increases, the current supplied to the field coil is forcibly turned off to reduce the duty factor to zero percent. The duty factor is increased gradually thereafter.

The above conventional electronic control device, however, has the following disadvantage. An accurate detection of the duty factor of the field duty signal requires an averaging thereof over a predetermined length of interval. Thus the detection of the duty factor immediately after the electric load is made tends to be late. It is thus impossible to prevent the substantial reduction of the idling rpm of the engine immediately after the making of the electric load. Further disadvantage is that since the output current is predicted on the basis of the field duty signal, the prediction error increases when the resistance of the field coil changes due to the variation of the ambient temperature. The accuracy and the reliability of control is then reduced.

SUMMARY OF THE INVENTION

It is therefore an object of this invention to provide an accurate and reliable electronic control device by which the substantial reduction of the idling rpm of the engine at the making of the electric load can be effectively prevented, thereby realizing an accurate control of the idling rpm of the engine.

The above object is accomplished in accordance with the principle of this invention by an electronic control device for controlling an alternator driven by an automotive engine, which comprises detector means for detecting an increase of a load current flowing through a load coupled to the alternator; comparator means, coupled to the detector means, for comparing the increase of a load current with a threshold level; control means, coupled to the comparator means, for controlling a current supply to a field coil of the alternator, the control means reducing the current supply to a first predetermined level for a first predetermined interval of time when the increase of the load current is greater than or equal to the threshold level, the control means gradually increasing the current supply over a second interval of time.

Preferably, the electronic control device includes idling judgment means for detecting an idling state of the engine; wherein the detector means is activated to detect the increase of the load current when the idling judgment means detects an idling state of the engine.

Still preferably, the electronic control device includes: second control means for controlling an air intake of the engine, the second control means increasing a control level of the air intake when the increase of the load current is greater than or equal to the threshold level; wherein the first interval of time is substantially equal to a delay time that a rotational speed of the engine responds to an increase in the control level of the air intake.

Further, it is preferred that the control means includes: means for controlling the current supply in accordance with a proportional plus integral control method. Alternatively, the control means includes: means for controlling the current supply in accordance with a proportional plus derivative control method. Still alternatively, the control means includes: means for controlling the current supply in accordance with a proportional plus integral plus derivative control method.

Still alternatively, it is also preferred that the electronic control device further includes: first current detector means for detecting output current of the alternator; second current detector means for detecting a load current flowing through a load coupled to the alternator; first judgment means, coupled to the first current detector means, for comparing the output current of the alternator with a first current threshold level, the first judgement means setting a light load state when the output current of the alternator is less than the first current threshold level; second judgment means, coupled to the second detector means, for comparing the load current with a second current threshold level, the second judgement means resetting a light load state when the load current is greater than or equal to the second current threshold level; cut-off control means, coupled to the first and second judgment means, for cutting off a current supply to a field coil of the alternator only when the light load state is set.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
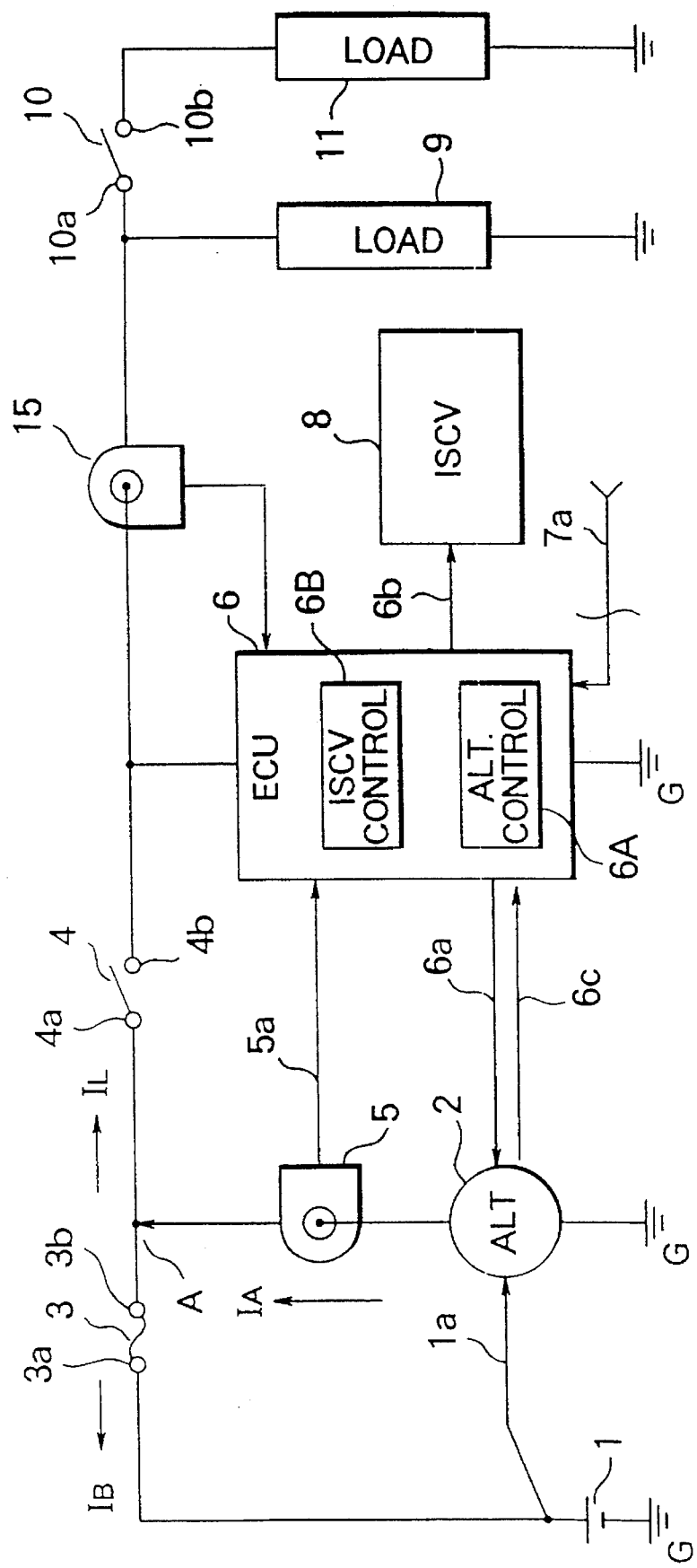
FIG. 1 is a circuit diagram showing an electronic control device for controlling the automotive alternator according to this invention.

FIG. 1 is a circuit diagram showing an electronic control device for controlling the automotive alternator according to this invention. A serial circuit consisting of an alternator 2 and a current sensor 5 is coupled across an automotive battery i through a fuse 3 having terminals 3a and 3b. The fuse 3 may be made of a fusible link disposed within a main fuse box (not shown). The voltage signal 1a of the battery 1 is supplied to an electronic control unit 6 via an alternator 2. The current sensor 5, coupled across the terminal 3b of the fuse 3 and the output terminal of the alternator 2, detects the output current $I_A$ of the alternator 2, and outputs a voltage signal 5a corresponding to the detected output current $I_a$ to the electronic control unit 6. The electronic control unit 6 is coupled across the battery 1 through the fuse 3 and the key switch 4 having terminals 4a and 4b. The output current $I_A$ of the alternator 2 is controlled by the electronic control unit 6 by means of the control signal 6a, in response to the voltage signal 5a received from the current sensor 5, the voltage signal 1a received from the battery 1, and further in response to external signals 7a. The signals 7a may include: the crank angle signal detecting predetermined crank angles for determining the rpm of the engine, the idling switch signal for detecting the idling opening position of the throttle valve, the throttle opening degree signal for the acceleration/deceleration judgment, the air intake rate signal, the starter switch signal, the input signal to the gears for detecting the neutral position and the gear meshing positions thereof, the breaking switch signal, and the head lights switch signal indicating the on and off state of the head lights of the automobile. The electronic control unit 6 includes an alternator control means 6A and an ISCV control means 6B. The alternator control means 6A of the electronic control unit 6 controls the output current $I_A$ of the battery 1 in accordance with a predetermined program as described below. The ISCV control means 6B of the electronic control unit 6 controls the operation of the ISCV (Idling Speed Control Valve) 8 by means of a control signal 6b. The ISCV (Idling Speed Control Valve) 8 serves as an actuator for effecting the ISC (Idling Speed Control) as described below.

The electric load 9, coupled across the terminal 4b of the key switch 4 and the ground, consists, for example, of various control units, the ignition coil, and the injector device of the engine. The electric load 9 may thus be of the same electric load type as the electronic control unit 6 and is continually turned on so long as the key switch 4 is made. A further electric load 11 is coupled across the terminal 4b of the key switch 4 and the ground through a switch 10 having terminals 10a and 10b. The electric load 11 includes the loads which are turned on and off by means of the switch 10. The electric load 11 includes, for example, the electric fan, the blower, the rear window defogger, the head lights, and the power windows driver of the automobile.

In FIG. 1, the sum of the current $I_B$ flowing through the fuse 3 and the load current $I_L$ flowing through the key switch 4 is equal to the output current $I_A$ of the alternator 2: $I_A=I_B+I_L$. The polarity of the currents are indicated by the directions of the arrows at $I_A$, $I_B$, and $I_L$. It is noted that when the field coil of the alternator 2 is excited and the alternator 2 is generating power, the current $I_B$ is generally positive (the battery 1 is charged by the alternator 2) and the load current $I_L$ is supplied from the output current $I_A$ of the alternator 2. On the other hand, when the field coil of the alternator 2 is not excited and the alternator 2 is not generating power, the load current $I_L$ is supplied from the battery 1.

Next, the operation of the electronic control device of FIG. 1 for controlling the alternator 2 and the ISCV (Idling Speed Control Valve) 8 is described. The alternator 2 is controlled by the alternator control means 6A. The ISCV (Idling Speed Control Valve) 8 is controlled by the ISCV control means 6B. The control operation of the alternator control means 6A includes: (1) the power generation cutting control during the light load for improving the mileage per unit amount of fuel, and (2) the load responding control of the alternator 2 for stabilizing the idling rpm of the engine. First, the power generation cutting control during the light load is described.

Figure 2:
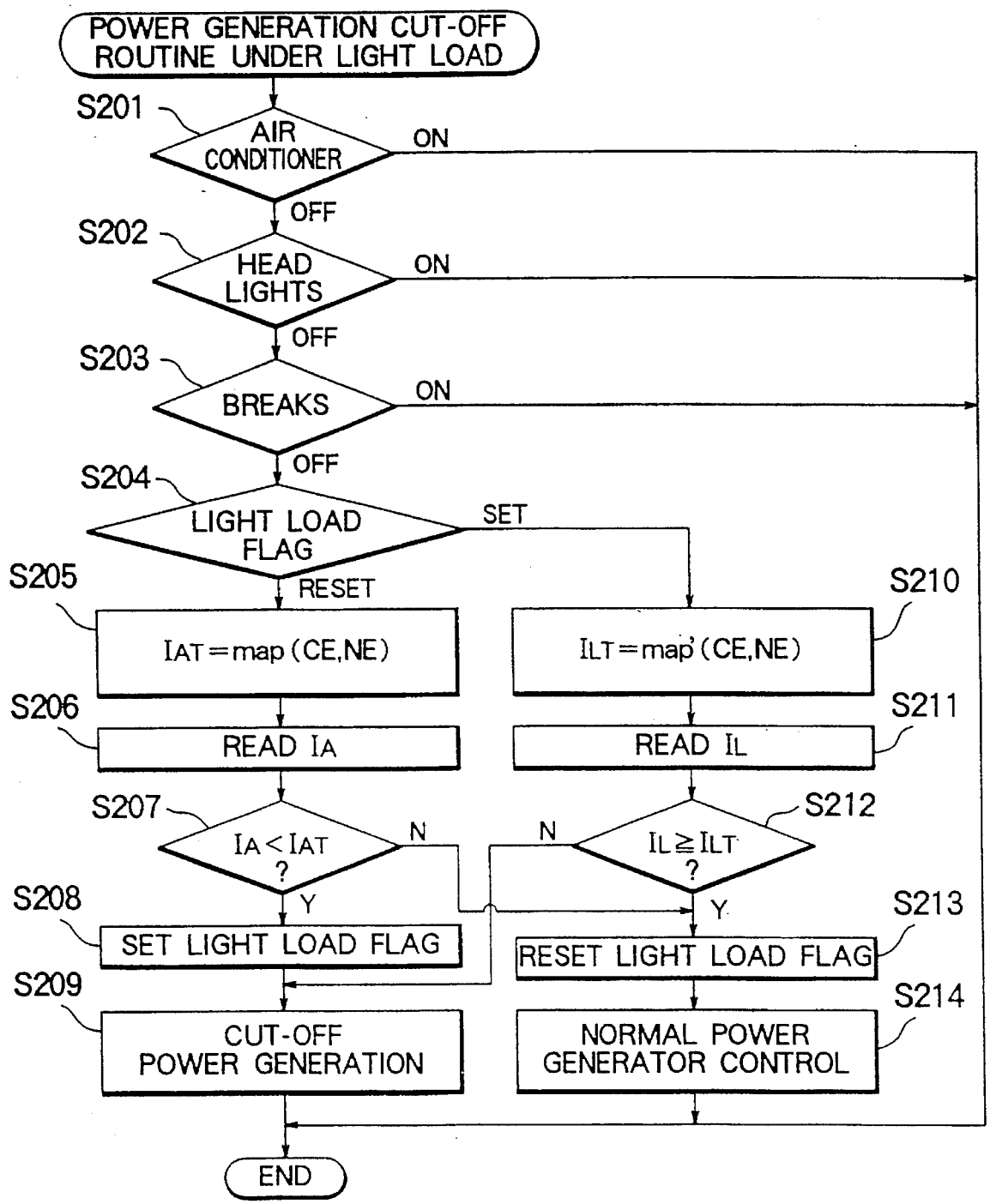
FIG. 2 is a flowchart showing the routine followed by the alternator control means 6A of the electronic control unit 6 of FIG. 1 for effecting the current generation cutting control under a light load.
Figure 3:
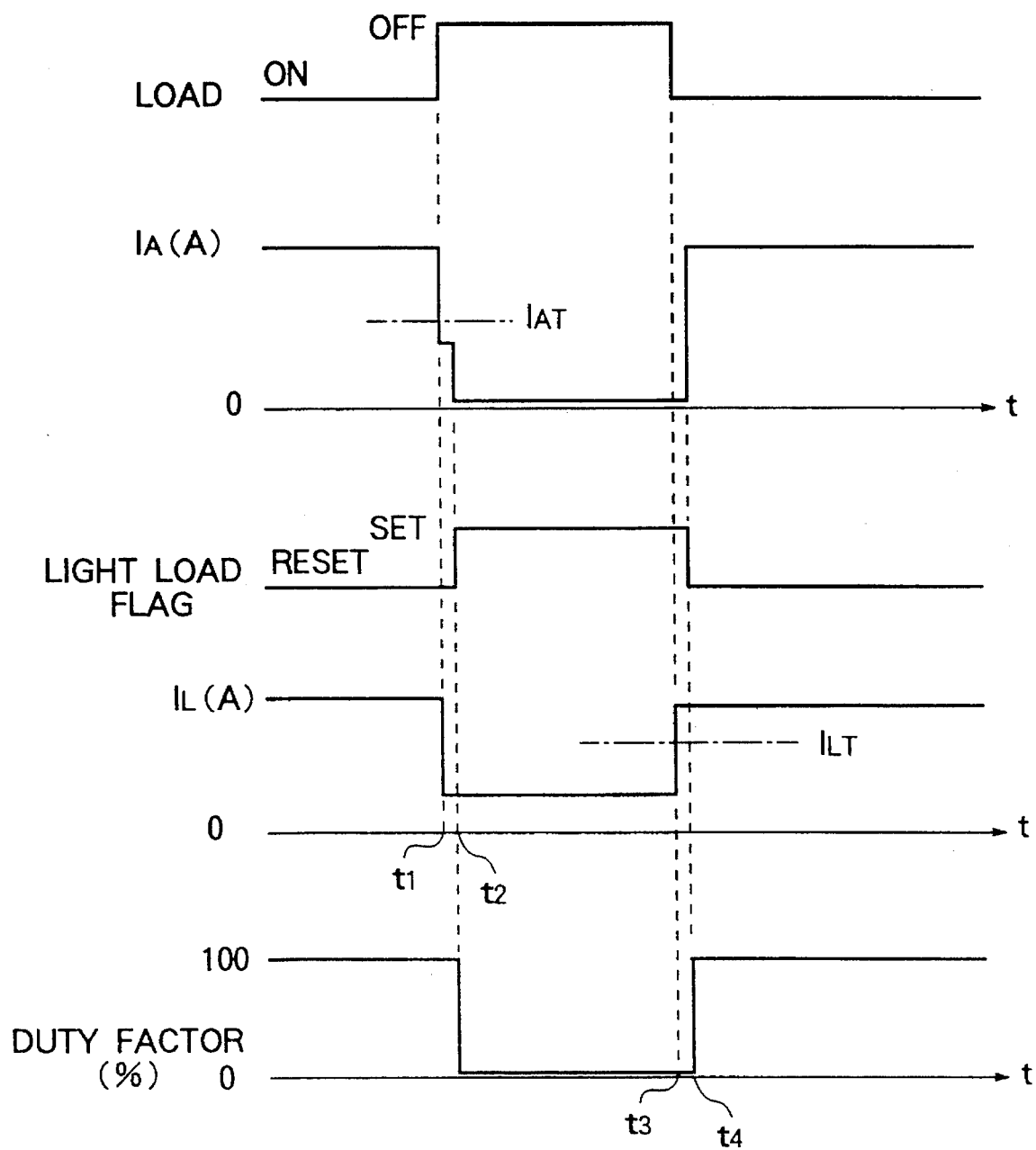
FIG. 3 is a time chart showing the various waveforms associated with the routine of FIG. 2.

FIG. 2 is a flowchart showing the routine followed by the alternator control means 6A of the electronic control unit 6 of FIG. 1 for effecting the current generation cutting control under a light load. FIG. 3 is a time chart showing the various waveforms associated with the routine of FIG. 2.

At step S201 in FIG. 2, it is judged whether the air conditioner of the automobile is turned on or off. If it is judged at step S201 that the air conditioner is turned on, the procedure of FIG. 2 is immediately terminated to prevent the battery consumption. At step S202, it is judged whether the head lights are turned on or off. If it is judged at step S202 that the head lights are turned on, the procedure of FIG. 2 is immediately terminated to prevent abrupt darkening of the lights during driving. At step S203, it is judged whether the breaks are energized (ON) or not (OFF). If it is judged at step S203 that the breaks are ON, the procedure of FIG. 2 is immediately terminated to prevent the increase in the torque of the engine, which may cause danger.

When it is judged at steps S201 through S203 that the air conditioner, the head lights and the breaks are all OFF, the execution proceeds to step S204, where it is judged whether the light load flag is set or reset. As will become apparent from the following description, the light load flag indicates whether the present totality of the electric load coupled to the battery 1 and the alternator 2 is light or not.

If it is judged at step S204 that the light load flag is reset, the execution proceeds to step S205, where a two-dimensional map map(CE,NE) of the load (represented by the variable CE) and the rpm (represented by the variable NE) of the engine is referenced to determine the alternator output current threshold level $I_{AT}$: $I_{AT}$=map(CE,NE). The two-dimensional map map(CE,NE) uses the CE value (the filling efficiency value) as representing the load. The CE value is obtained as the rate of air intake divided by the rpm of the engine, in accordance with a routine (not shown) for the calculation of the amount of fuel, etc. Next at step S206, the present level of the alternator output current $I_A$ is determined on the basis of the voltage signal 5a received from the current sensor 5. Further at step S207, it is judged whether or not the alternator output current $I_A$ is less than the alternator output current threshold level $I_{AT}$ ($I_A<I_{AT}$), the affirmation of which judgment condition implies that the alternator is under the light load state. Thus, if the judgment is affirmative (i.e., $I_A<I_{AT}$) at step S207, the execution proceeds to step S208, where the light load flag is set. After the step S208, the execution proceeds step S209, where the power generation is cut off (the duty factor of the control signal 6a of the alternator 2 is set at zero percent such that the excitation of the field coil thereof ceases). On the other hand, if the judgment is negative at step S207, the execution proceeds to step S213, where the light load flag is kept reset, and the duty factor of the alternator 2 is kept at 100 percent at step S214.

The operation when it is judged at step S204 that the light load flag is set is as follows. When it is judged at step S204 that the light load flag is set, the execution proceeds to step S210, where a two-dimensional map map'(CE,NE) of the variable CE representing load and the variable NE representing the rpm of the engine is referenced to determine the load current threshold level $I_{LT}$: $I_{LT}$=map(CE,NE). The load current threshold level $I_{LT}$ may be determined by means of the two-dimensional map, or may be calculated using an experimentally and theoretically determined equation involving the values of the variables CE and NE. At step S211, the present level of the load current $I_L$ is determined. Next at step S212, it is judged whether or not the load current $I_L$ measured by, for example, current sensor 15, is greater than or equal to the load current threshold level $I_{LT}$. The affirmation of the judgment condition at step S212 implies that the load is not light. Thus, if the judgment is affirmative at step S212 (i.e., $I_L \geq I_{LT}$), the execution proceeds to step S213, where the light load flag is reset. Further at step S214, the duty factor of the alternator 2 is set at 100 percent such that the cut-off of the power generation of the alternator 2 is terminated and the normal power generation is resumed. On the other hand, if the judgment is negative at step S212, the execution proceeds to step S209, where the duty factor of the alternator 2 is set at zero percent and the power generation is continued to be cut off.

FIG. 3 is a time chart showing the various waveforms associated with the routine of FIG. 2. It is assumed that initially (i.e., at the left end in FIG. 3) the electric load is turned on and the light load flag is reset (see the top and the third waveforms of FIG. 3). Thus, initially, the duty factor of the control signal of the alternator 2 is 100 percent (see the bottom waveform) and the output current $I_A$ is above the alternator output current threshold level $I_{AT}$ (see the second waveform). Thus the load current $I_L$ (see the fourth waveform) is supplied primarily from the alternator 2.

At the time point $t_1$, the electric load is turned off and the load current $I_L$ is reduced to a level below the load current threshold level $I_{LT}$. At the same time, the alternator output current $I_A$ is reduced to a level below the alternator output current threshold level $I_{AT}$. It is noted that the load current $I_L$ does not vanish since there is a small electric load which is kept turned on so long as the key switch 4 is made (for example, the electric load 9 in FIG. 1). Under this circumstance, the execution of the procedure of FIG. 2 proceeds through steps S201 through S204 to step S205. Then, at time point $t_2$ immediately after time point $t_1$, it is judged at step S207 that the alternator output current $I_A$ determined at step S206 is less than the alternator output current threshold level determined at step S205. Thus the light load flag is set at step S208. Further at step S209, the duty factor of the alternator 2 is set at zero percent and the power generation of the alternator 2 is cut off. Thus, the level of the alternator output current $I_A$ is further reduced to a vanishingly small level.

Under this circumstance, upon entering the routine of FIG. 2, the execution proceeds from step S204 to step S210, since the light load flag is set. However, since the load current $I_L$ is less than the load current threshold level $I_{LT}$, the judgment at step S212 is negative, and the power generation cutting-off control of the alternator 2 is maintained until the time point $t_3$.

At the time point $t_3$, the electric load is turned on. Then the load current $I_L$ returns to a level above the load current threshold level $I_{LT}$. The load current $I_L$ is then supplied from the battery 1. At the time point $t_4$ immediately after the time point $t_3$, the judgement at step S212 thus becomes affirmative when the procedure of FIG. 2 is executed, and the light load flag is set at step S213 and the normal power generation is resumed at step S214. As a result, the duty factor returns to 100 percent at time point $t_4$, and, at the same time, the alternator output current $I_A$ returns to the normal level.

Figure 4:
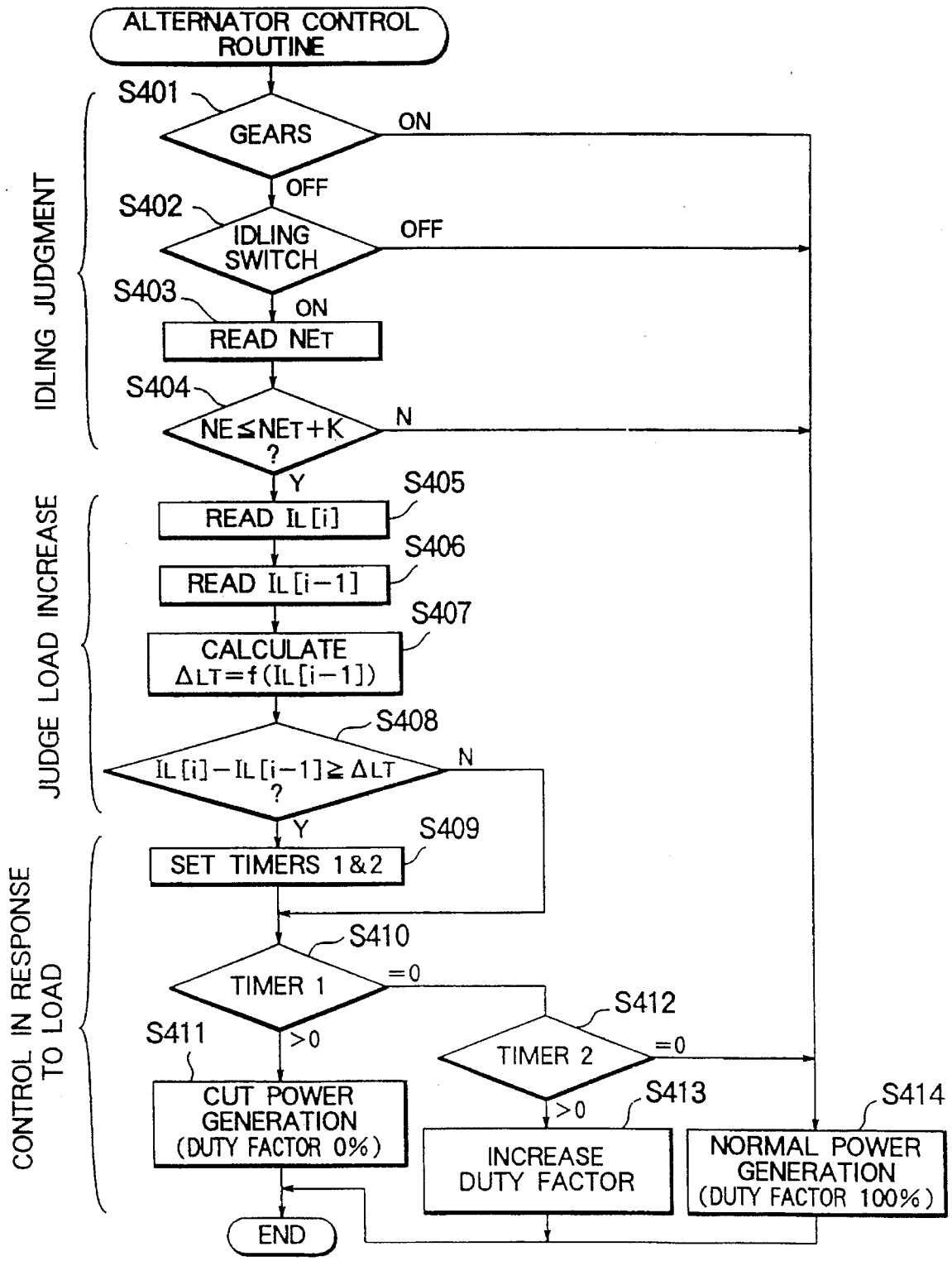
FIG. 4 is a flowchart showing the routine followed by the alternator control means 6A of the electronic control unit 6 of FIG. 1, for stabilizing the idling state by controlling the alternator in response to an increase in the electric load.
Figure 5:
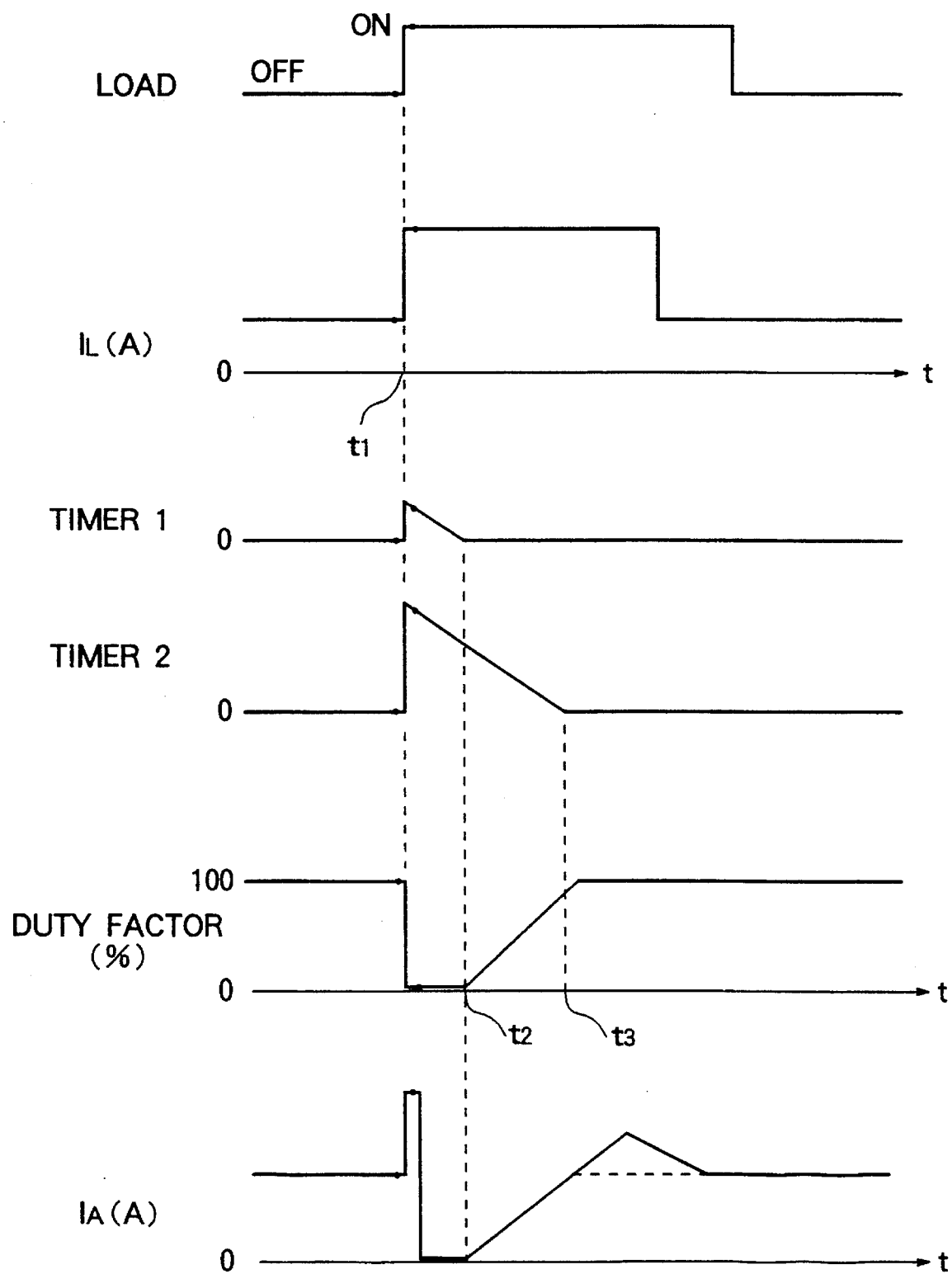
FIG. 5 is a time chart showing the various waveforms associated with the routine of FIG. 4.

FIG. 4 is a flowchart showing the routine followed by the alternator control means 6A of the electronic control unit 6 of FIG. 1, for stabilizing the idling state by controlling the alternator in response to an increase in the electric load. FIG. 5 is a time chart showing the various waveforms associated with the routine of FIG. 4. At steps S401 through S404, it is judged whether or not the engine is in the idling state. Thus at step S401, it is judged whether or not the gear is meshing (ON) or in the neutral (OFF). If the gear is ON, the engine is not in the idling state and hence the execution proceeds to step S414, where the duty factor of the alternator 2 is set at 100 percent such that the current is generated normally. At step S402, it is judged whether or not the idling switch is turned on or off. If the idling switch is OFF, the engine is not in the idling state and hence the execution proceeds to step S414, where the duty factor of the alternator 2 is set at 100 percent such that the current is generated normally. At step S403, the ISC (Idling Speed Control) reference value (i.e., the reference idling rpm of the engine) $NE_T$ is read out of the memory (not shown) of the electronic control unit 6. At step S404, it is judged whether or not the current rpm value of the engine NE is less than or equal to the reference value plus a constant $NE_T+K$ (i.e., it is judged whether $NE \leq NE_T+K$, where K is a predetermined constant). The affirmative judgment at step S404 (i.e., $NE \leq NE_T+K$) implies that the engine is in the idling state. Thus, if the judgment is negative at step S404, the execution proceeds to step S414, where the duty factor of the alternator 2 is set at 100 percent such that the current is generated normally. On the other hand, if the judgment is affirmative at step S404, the execution proceeds to steps S405 through S408, where it is judged whether or not the load is increasing.

At step S405, the present value of the load current $I_L[i]$ is determined. At step S406, the previous value of the load current $I_L[i-1]$ (the load current $I_L$ at a time point a predetermined short interval before the present, which is stored in the memory within the electronic control unit 6) is read out. At step S407, the load current threshold increment level $\Delta_{LT}$ is determined as a function of the previous value of the load current $I_L[i-1]$: $\Delta_{LT}$=f($I_L[i-1]$). At step S408, it is judged whether or not the increase of the load current, $I_L[i]-I_L[i-1]$, is greater than or equal to the load current threshold increment level $\Delta_{LT}$: $I_L[i]-I_L[i-1] \geq \Delta_{LT}$. If the judgment is affirmative at step S408, the execution proceeds to step S409, where the load responding timers 1 and 2 (not shown) within the electronic control unit 6 are set simultaneously. As described below by reference to FIG. 5, the time set in timer 1 is shorter than the time set in timer 2. The execution proceeds to step S410 after the timers are set at step S409. If the judgment is negative at 408, the execution proceeds directly to step S410.

At step S410, it is judged whether time remains in timer 1 (the time remaining in timer 1>0) or not (the time remaining in timer 1=0). If the time still remains in timer 1, the execution proceeds to step S411, where the duty factor of the alternator 2 is set at zero percent such that the power generation is cut off. On the other hand, if the time in timer 1 is out (=0), the execution proceeds to step S412, where it is judged whether time remains in timer 2 (the time remaining in timer 2>0) or not (the time remaining timer 2=0). If time still remains in timer 2, the execution proceeds to step S413, where the duty factor of the alternator 2 is gradually increased (incremented at each predetermined short interval of time) such that the current generated by the alternator 2 is increased accordingly. On the other hand, if the time in timer 2 is out ( =0), the execution proceeds to step S414, where the duty factor of the alternator 2 is set at 100 percent, such that the current is generated normally by the alternator 2. The steps S410 through S414 perform the load responding control (i.e., the control in response to load state) of the alternator 2.

FIG. 5 is a time chart showing the various waveforms associated with the routine of FIG. 4. Next, the operations of the timers 1 and 2 are described in detail. The load responding control of the alternator 2 (i.e., the procedure of FIG. 4) is performed for preventing the reduction of the idling rpm of the engine in the case where the electric load is turned on while the engine is idling. The procedure is performed by the alternator control means 6A in conjunction with the idling rpm load adjustment control performed by the ISCV control means 6B.

For the purpose of stabilizing the idling state of the engine, it is already known to provide switches for respective electric loads, and increase the air intake in response to the operation of the switches. However, providing separate switches for a multitude of electric loads incurs substantial cost. Further, the number of connectors (not shown) in the electronic control unit 6 limits the number of such switches that can be provided. Thus, it has been proposed to detect the turning-on of the electric load by sensing the drop of the battery voltage and to interrupt the power generation of the alternator 2 temporarily upon detection of the turn-on of the electric load, the power generation being gradually returned to the normal level thereafter. The abrupt reduction of the idling rpm of the engine caused by the connection of the electric load is thus avoided. This type of alternator control is referred to as the load responding control of the alternator. Generally, according to this load responding control, the power generation is returned to the normal level gradually over an interval of five through ten seconds. The response speed (i.e., the interval over which the rpm of the engine is returned to the normal level) is determined in accordance with response speed of the feedback control of the idling rpm of the engine. However, the response speed of this control method may sometimes be too slow. Namely, when the electric load varies during the control operation (i.e., during the response time) the control cannot respond to such variation appropriately. Further, when the load consists of the head lights, the lights becomes darker for a substantial length of time, which may cause a danger for the driver of the automobile.

Further method of adjusting to the electric load which has hitherto been proposed is to detect the increase in the electric load from the increase in the alternator output current, and, in response to the increase of the electric load, to increase the air intake by means of the ISCV (Idling Speed Control Valve). This method of adjusting to the load has the inherent delay due to the engine strokes (the suction stroke, the compression stroke, the combustion or expansion stroke, and the exhaustion stroke) after the air intake is increased. The torque is increased only after three strokes. Consequently, the rpm of the engine is reduced substantially, immediately after the electric load is turned on.

Thus, according to this embodiment, the load responding control of the alternator (effected by the alternator control means 6A) and the idling rpm control in response to load variation (effected by the ISCV control means 6B as described below) are combined, such that the rpm of the engine is not reduced immediately after the electric load is turned on and, at the same time, the power generation by the alternator 2 and the idling rpm of the engine thereafter are controlled appropriately.

The timer 1 for the load responding control is provided for compensating for the delay due to the strokes of the engine. Thus, the time set in timer 1 is substantially equal to the time needed for three strokes of the idling engine. Assuming that the engine is a four-cycle engine and that the idling speed of the engine is 750 rpm, the time set in timer 1 is about 120 milliseconds.

On the other hand, the timer 2 is set to a time substantially equal to the delay time or the time constant of the air intake when tile air intake is increased stepwise by means of the ISCV. The time constant varies in dependence upon the rpm of the engine. Namely, the time constant decreases as the rpm of the engine increases. The duty factor of the alternator 2 is to be increased from zero to 100 percent over the time length substantially equal to the delay time (the time constant) of the air intake. Thus at the step S413 in FIG. 4, the duty factor is incremented at a short interval of time corresponding to the rpm of engine (for example, at each interval of time determined as a predetermined function of the rpm whose value decreases as the rpm increases, or at each occurrence of the pulse of the crank angle signal included in the signals 7a of FIG. 1), thereby increasing the duty factor of the alternator 2 from zero to 100 percent over the length of time equal to the time constant of the air intake.

Figure 6:
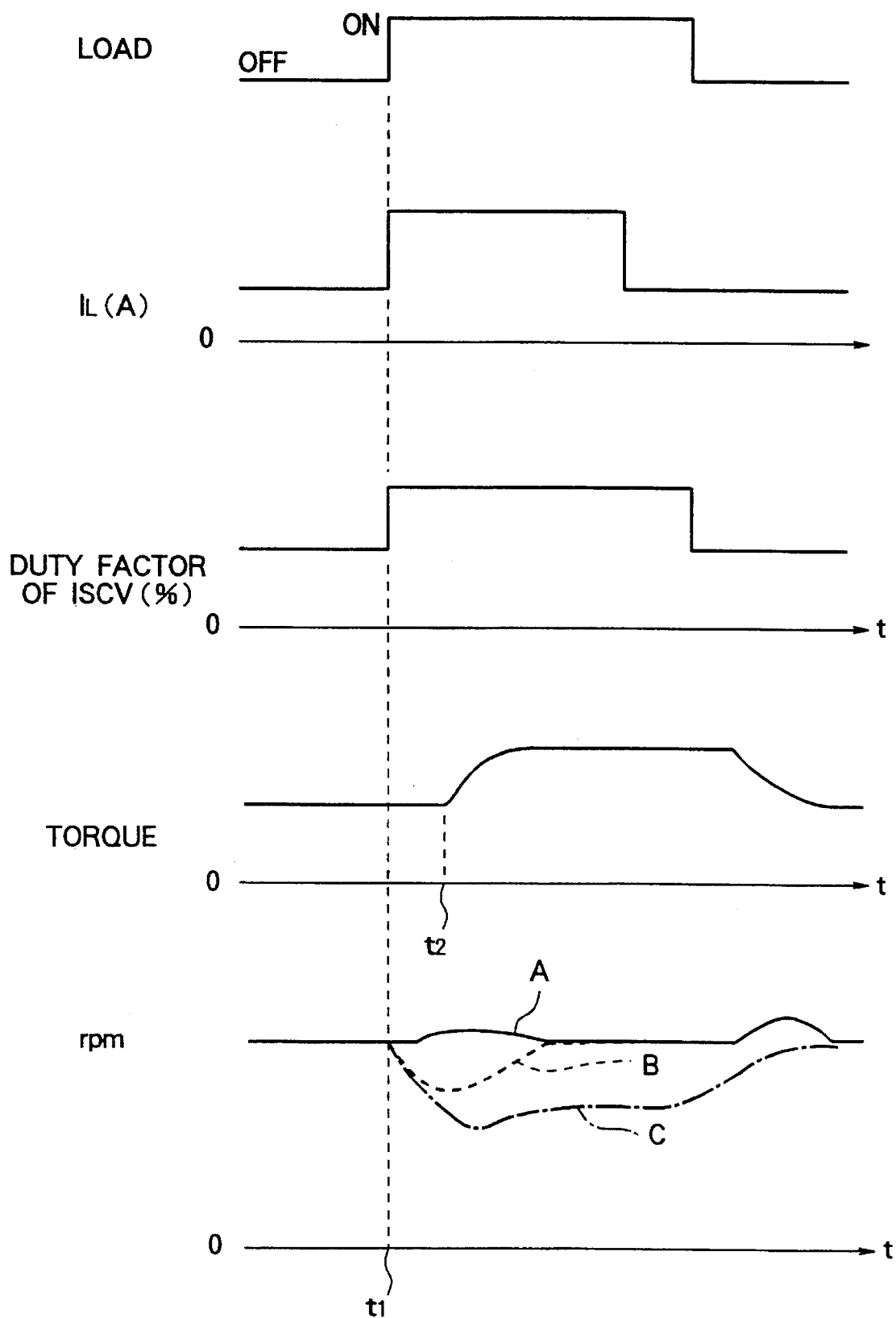
FIG. 6 is a time chart showing the various waveforms associated with the routine followed by the ISCV control means 6B of the electronic control unit 6 of FIG. 1, for stabilizing the idling state by adjusting the ISCV (Idling Speed Control Valve) in response to an increase in the electric load.

FIG. 6 is a time chart showing the various waveforms associated with the routine followed by the ISCV control means 6B of the electronic control unit 6 of FIG. 1, for stabilizing the idling state by adjusting the ISCV (Idling Speed Control Valve) in response to an increase in the electric load. In accordance with the idling rpm control method, the ISCV is controlled such that the air intake to the engine is adjusted, thereby controlling the idling rpm of the engine. The increase of the electric load is detected by determining the increase in the load current $I_L$. This detection of the increase of the electric load may be effected at steps S405 through S408 in FIG. 4. When the increase in the load current is detected, the load responding control of the alternator of FIG. 4 is effected as described above. At the same time, the duty factor of the ISCV is increased in accordance with the amount of increase in the load current. It is here assumed that the ISCV adjusts the air intake of the engine in accordance with the duty factor of the control signal thereof. The ISCV may thus be a solenoid-type ISCV valve.

Next, the above simultaneous operation is described in greater detail referring to FIGS. 4 through 6. It is assumed that the electric load is turned on at the time point $t_1$ (see the top waveform in FIGS. 5 and 6). Thus the load current $I_L$ increases abruptly at the time point $t_1$ (see the second waveform in FIGS. 5 and 6). The timers 1 and 2 are set at step S409 to values as described above (see the third and fourth waveforms in FIG. 5, where the height of the curves corresponds to the time set in respective timers), and the duty factor of the alternator is reduced to zero percent at step S411 (see the fifth waveform in FIG. 5). The alternator output current $I_A$ increases abruptly at the time point the electric load is turned on, but is reduced to a vanishing small level immediately thereafter. (see the bottom waveform in FIG. 5).

Simultaneously, at the time point $t_1$, the duty factor of the ISCV is increased by an amount corresponding to the increase in the load current $I_L$ (see the third waveform in FIG. 6). The torque of the engine, however, remains substantially constant until the time point $t_2$, and increases gradually thereafter (see the fourth waveform in FIG. 6).

At the time point $t_2$, the time remaining in the timer 1 is reduced to zero (see the third waveform of FIG. 5) and the electronic control unit 6 begins to increase the duty factor of the alternator 2 at step S413 of FIG. 4 (see the fifth waveform of FIG. 5). At the time point $t_3$, the time set in the timer 2 is reduced to zero (see the fourth waveform of FIG. 5), and the duty factor of the alternator 2 reaches 100 percent.

Thus, during the interval between the time points $t_1$ and $t_2$ in which the torque of the engine does not increase, the duty factor of the alternator 2 is set at zero percent, such that the rpm of the engine is kept substantially at a constant level as represented by the waveform A at the bottom of FIG. 6. As the torque of the engine gradually increases after the time point the duty factor of the alternator 2 is increased in accordance therewith (see the fifth waveform of FIG. 5). The increase of the torque of the engine is compensated for by the increase in the alternator output current $I_A$. Thus, the rpm of the engine represented by curve A in FIG. 6 remains substantially stable over the whole control period. The waveforms B and C in FIG. 6 shows the variation of the rpm of the engine where only the idling speed control by means of the ISCV control means 6B is effected (curve B) and neither the idling speed control by the ISCV control means 6B nor the load responding control of the alternator by the alternator control means 6A are effected (curve C).

In the case of the above embodiment, the duty factor of the alternator 2 is controlled to zero percent as shown in FIGS. 4 and 5 when the increase in the load current is large. The output current of the alternator 2 is then cut off to a vanishingly small level. However, in the case of practical automotive engines, the alternator 2 is constantly in the state of generating current at the level of 10 to 20 amperes. When the alternator is controlled at the duty factor of 100 percent, the current generated by the fundamental built-in function of the alternator 2 occupies about 25 percent of the overall output current of the alternator. This serves as the engine load for balancing and stabilizing the rpm of the engine.

Thus, if the duty factor of the alternator 2 is abruptly set at zero percent, the load on the engine is reduced too abruptly, such that the rpm of the engine may rise sharply.

Thus, the step S411 of FIG. 4 may be modified as follows. Namely, instead of setting the duty factor of the alternator 2 at zero percent, alternator 2 is set to the level equal to that before the increase in the electric load is detected. The duty factor of the alternator 2 may be set at about 25 percent. Alternatively, the values of the duty factor of the alternator 2 are determined beforehand as a function or a two-dimensional map of the voltage signal $5a$ of the current sensor 5 and the rpm of the engine and are stored in the memory of the electronic control unit 6. At step S411, the duty factor of the alternator 2 is initially set at the level stored in the electronic control unit 6 (i.e., the level determined by the map function), and is increased gradually thereafter at step S413. Still alternatively, the alternator 2 may be provided with a built-in terminal by which the duty factor thereof can be monitored. Then, the duty factor of the alternator 2 is detected by the alternator control means 6A of the electronic control unit 6 from the monitoring signal $6c$ of FIG. 1, and stored in the memory (not shown) of the electronic control unit 6. At step S411, the duty factor of the alternator 2 is initially set at the level of the duty factor before the increase in the load current is detected, and is increased gradually thereafter at step S413. According to this method, an accurate control is realized and the above mentioned problem of abrupt increase in the rpm of the engine is completely solved.

Figure 7:
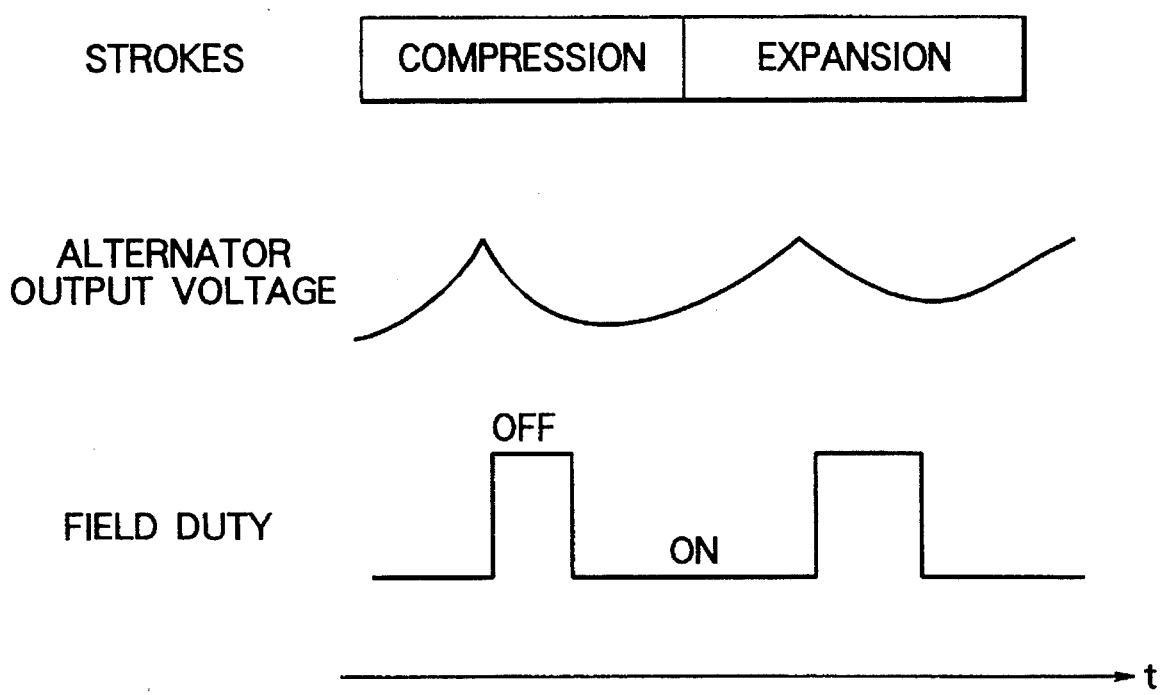
FIG. 7 is a diagram showing the variation of the alternator output voltage and the ON/OFF periods of the field duty of the alternator in accordance with a preferred control method of the duty factor of the alternator 2 by the alternator control means 6A of the electronic control unit 6.

By the way, as described above, the output current $I_A$ of the alternator 2 is controlled by the alternator control means 6A of the electronic control unit 6 on the basis of the voltage signal $1a$ received from the battery 1 and the voltage signal $5a$ received from the current sensor 5. However, detailed analysis of the operation of the engine shows that the load upon the torque of the engine becomes great relative to the output torque of the engine just before the completion of the compression stroke of the engine, and the rpm of the engine is reduced thereat. Thus, the rpm of the engine undergoes periodical variation. The output voltage level of the alternator 2 follows the rpm of the engine as shown by the curve at the middle row in FIG. 7. The built-in control of the current supply to the field coil of the alternator is effected in synchronism with the strokes of the engine, as shown by the waveform at the bottom of FIG. 7 representing the field duty of the alternator, where the ON state corresponds to the power generation state and the OFF state corresponds to the non-power generation state of the alternator. By synchronizing the field duty of the alternator with the engine strokes, the variation of the rpm of the engine is minimized. The in accordance with the above embodiment, the duty factor of the alternator 2 is controlled by the alternator control means 6A of the electronic control unit 6 by means of the control signal $6a$ applied on the control terminal of the alternator 2. Thus, it is preferred that the ON and OFF periods of the control signal $6a$ is synchronized with the engine strokes as shown in FIG. 7, on the basis of the crank angle signal contained in the signals $7a$.

Figure 8:
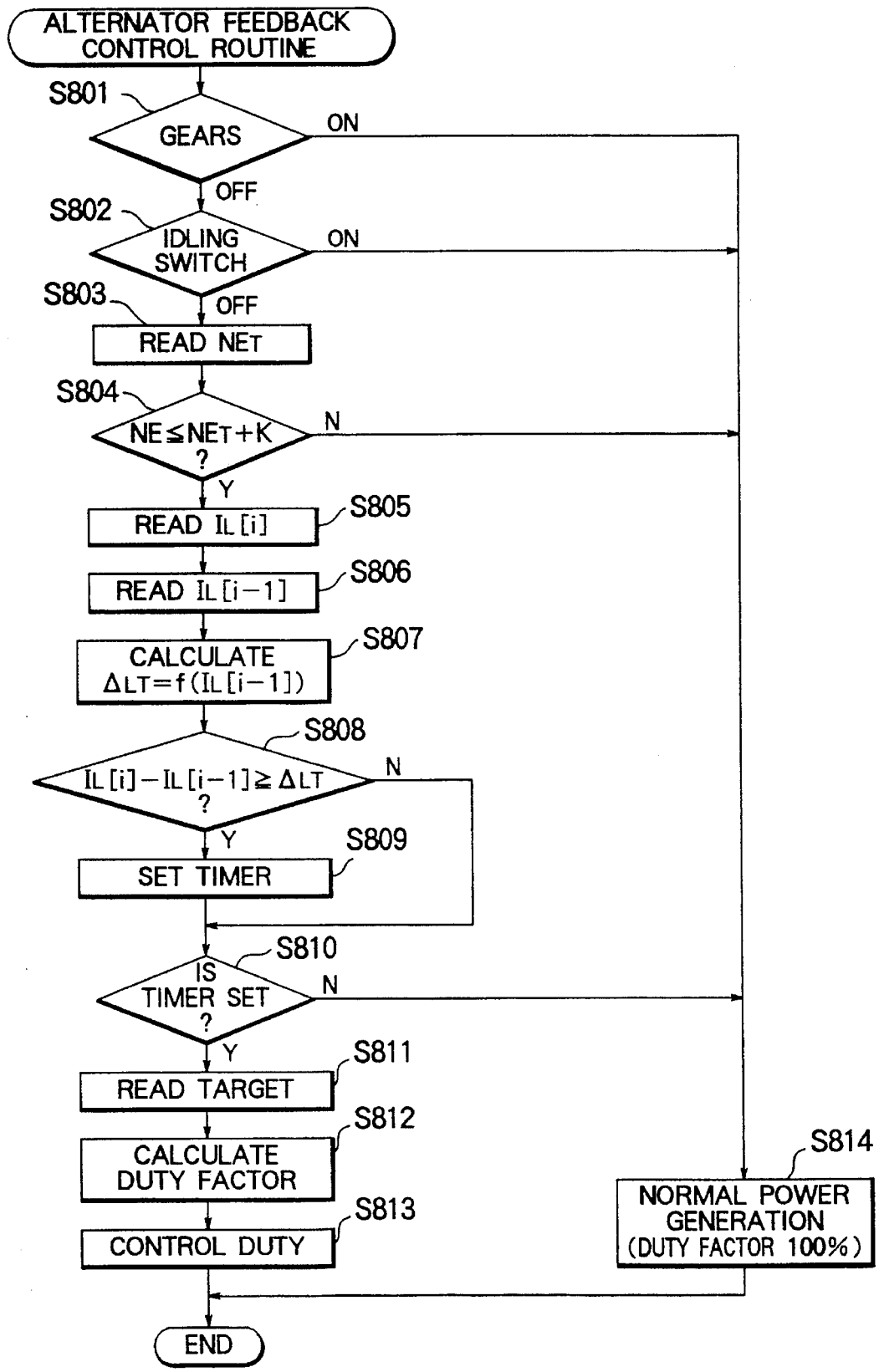
FIG. 8 is a flowchart showing another routine (the feedback control routine) followed by the alternator control means 6A of the electronic control unit 6 of FIG. 1, for stabilizing the idling state by controlling the alternator in response to an increase in the electric load.

FIG. 8 is a flowchart showing another routine (the feedback control routine) followed by the alternator control means 6A of the electronic control unit 6 of FIG. 1, for stabilizing the idling state by controlling the alternator in response to an increase in the electric load. The steps S801 through S808 are similar to the steps S401 through S408 of FIG. 4. Thus, the description thereof is not repeated here. If the judgment is affirmative at step S808 (the increase in the load current $I_L$ is greater than the threshold, $I_L[i]-I_L[i-1] \geq \Delta_{LT}$), the execution proceeds to step S809, where a load responding timer is set. The execution proceeds to step S810 after step S809. On the other hand, if the judgment is negative at step S808, the execution proceeds directly to step S810.

At step S810, it is judged whether or not the timer is set. If the judgment is negative at step S810, the execution proceeds to step S814, where the duty factor of the alternator 2 is set at 100 percent and the power is generated normally by the alternator 2. On the other hand, if the judgment is affirmative at step S810, the execution proceeds to step S811, where the target output current level curve of the alternator 2 is read out from the memory of the electronic control unit 6. The target output current level curve has the initial value equal to the current level before the increase in the load current $I_L$ is detected at steps S805 through S808, and increases gradually as the time remaining in the timer is reduced. The target output current level curve may remain at the initial value during the interval between the time points $t_1$ and $t_2$ in FIG. 5, and then increase gradually during the interval between the time points $t_2$ and $t_3$ in FIG. 5, where the timer of the procedure of FIG. 8 corresponds to the timer 2 of the procedure of FIG. 4. The target output current level curve is determined beforehand and stored in the memory of the electronic control unit 6.

At step S812, the deviation of the actual output current level of the alternator 2 with respect to the target level of the curve read out at step S811 is determined, and the duty factor of the alternator 2 (i.e., the duty factor of the control signal 6a) is calculated in accordance with the PID (proportional plus integral plus derivative) control action. Thus the duty factor D is determined in accordance with the equation:

$$D = K \cdot (z + (1/T_I) \int z \cdot dt + T_D (dz/dt)),$$

where K is the proportional sensitivity, the variable z represents the deviation of the actual output current level of the alternator 2 with respect to the target level of the curve read out at step S811, and $T_I$ and $T_D$ are the integral time and the derivative time (rate time), respectively. Alternatively, the duty factor of the alternator 2 may be calculated in accordance with the PI (proportional plus integral) control action. Then, the duty factor D is thus determined as:

$$D = K(z + (1/T_I) \int z \cdot dt),$$

where K is the proportional sensitivity, the variable z represents the deviation of the actual output current level of the alternator 2 with respect to the target level read out at step S811, and $T_I$ is the integral time (the time over which integral is taken). Still alternatively, the duty factor of the alternator 2 may be calculated in accordance with the PD (proportional plus derivative) control action. Then, the duty factor D is thus determined as:

$$D = K(z + (1/T_D)(dz/dt)),$$

where K is the proportional sensitivity, the variable z represents the deviation of the actual output current level of the alternator 2 with respect to the target level read out at step S811, and $T_D$ is the derivative time (the time length over which the derivative is taken).

At step S813, the duty factor of the alternator 2 is controlled to the level calculated at step S812 by means of the control signal 6a. Although not shown explicitly in FIG. 8, the steps S812 and S813 are repeated until the time set in the timer at step S809 is out (=0), such that the duty factor of the alternator 2 is controlled in accordance with the target output current level curve read out at step S811.

What is claimed is:

1. An electronic control device for controlling an alternator driven by an automotive engine system, including a battery, comprising:

detector means connected in series with the alternator and the battery for detecting an increase of a load current flowing through a load coupled to said alternator;

comparator means, coupled to said detector means, for comparing said increase of the load current with a threshold level; and control means, coupled to said comparator means, for controlling a current supply to a field coil of said alternator, said control means reducing said current supply to a first predetermined level for a first predetermined interval of time when said increase of said load current is greater than or equal to said threshold level, and thereafter gradually increasing said current supply over a second interval of time.

2. An electronic control device as claimed in claim 1, further comprising: idling judgment means for detecting an idling state of said engine; wherein said detector means is activated to detect said increase of said load current when said idling judgment means detects an idling state of said engine.

3. An electronic control device as claimed in claim 1, further comprising:

second control means for controlling an air intake of said engine, said second control means increasing a control level of said air intake when said increase of said load current is greater than or equal to said threshold level; wherein said first interval of time is substantially equal to a delay time that a rotational speed of said engine takes to respond to an increase in said control level of said air intake increase.

4. An electronic control device as claimed in claim 1, wherein said control means includes: means for controlling said current supply in accordance with a proportional plus integral control method.

5. An electronic control device as claimed in claim 1, wherein said control means includes: means for controlling said current supply in accordance with a proportional plus derivative control method.

6. An electronic control device as claimed in claim 1, wherein said control means includes: means for controlling said current supply in accordance with a proportional plus integral plus derivative control method.

7. An electronic control device as claimed in claim 1, further comprising:

first current detector means for detecting output current of said alternator;

second current detector means for detecting a load current flowing through a load coupled to said alternator;

first judgment means, coupled to said first current detector means, for comparing said output current of said alternator with a first current threshold level, said first judgement means setting a light load state when said output current of said alternator is less than said first current threshold level;

second judgment means, coupled to said second detector means, for comparing said load current with a second current threshold level, said second judgement means resetting a light load state when said load current is greater than or equal to said second current threshold level;

cut-off control means, coupled to said first and second judgment means, for cutting off a current supply to a field coil of said alternator only when said light load state is set.

* * * * *